United States Patent [19]

Bast

[11] 4,438,056
[45] Mar. 20, 1984

[54] METHOD FOR PRODUCING A CORRUGATED PIPE HAVING A SMOOTH LINING OF FOAM PLASTIC

[75] Inventor: Bernard J. Bast, Bethlehem, Pa.

[73] Assignee: Bethlehem Steel Corporation, Bethlehem, Pa.

[21] Appl. No.: 395,214

[22] Filed: Jul. 6, 1982

Related U.S. Application Data

[62] Division of Ser. No. 166,660, Jul. 7, 1980, abandoned.

[51] Int. Cl.³ .............................................. B29D 27/04
[52] U.S. Cl. .................................. 264/45.2; 138/149; 264/45.7; 264/46.9; 425/817 R
[58] Field of Search .................. 264/45.2, 53, 46.9, 264/46.6, 45.7; 425/817 R; 138/149

[56] References Cited

U.S. PATENT DOCUMENTS

| | | | |
|---|---|---|---|
| 2,746,090 | 4/1956 | Hoover | 138/173 X |
| 2,907,074 | 10/1959 | Rhodes | 264/45.2 |
| 3,345,245 | 10/1967 | Hanusa | 138/149 X |
| 3,422,856 | 1/1969 | Hunter et al. | 138/143 |
| 3,651,180 | 3/1972 | Glueckert | 264/53 X |
| 3,894,131 | 7/1975 | Speech | 264/45.2 |
| 4,245,970 | 1/1981 | St. Onge | 264/45.2 X |
| 4,367,105 | 1/1983 | Rosier et al. | 425/817 C X |

FOREIGN PATENT DOCUMENTS 663979  5/1963  Canada .............................. 264/45.2

*Primary Examiner*—Philip E. Anderson
*Attorney, Agent, or Firm*—John I. Iverson

[57] ABSTRACT

A smooth, plastic-lined corrugated pipe having an intermediate layer of plastic foam. The pipe is made by internally coating a corrugated pipe with a foaming mixture and pressing an expandable cylinder of plastic sheet liner against the foaming mixture until the foam solidifies. An expandable mandrel apparatus presses the plastic sheet liner into position.

7 Claims, 6 Drawing Figures

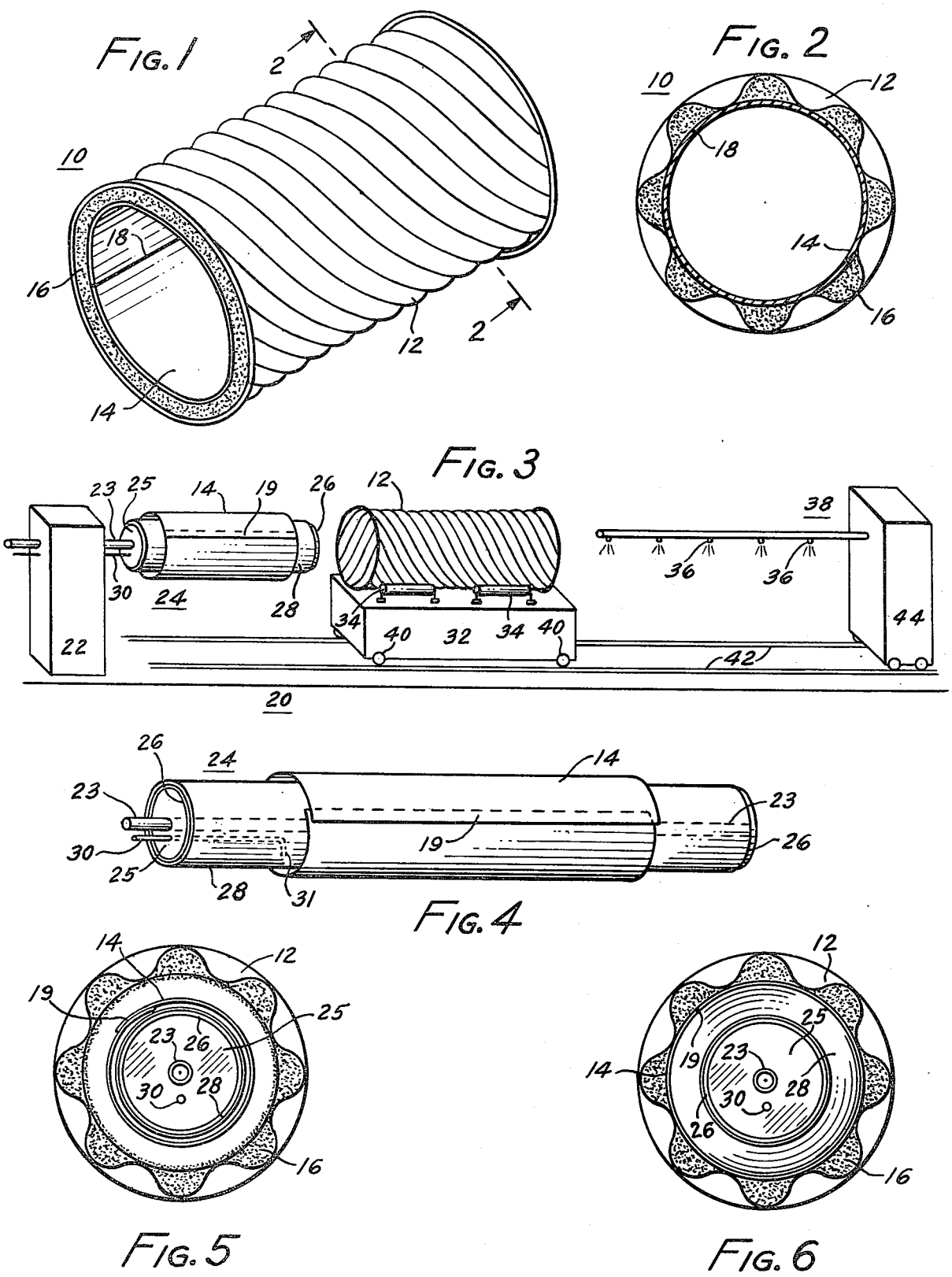

METHOD FOR PRODUCING A CORRUGATED PIPE HAVING A SMOOTH LINING OF FOAM PLASTIC

This is a division, of application Ser. No. 06/166,660, filed July 7, 1980 and now abandoned.

CROSS-REFERENCE TO RELATED APPLICATION

A related application entitled "Expandable Mandrel Apparatus for Manufacturing Smooth-Lined Corrugated Pipe" was filed by B. J. Bast concurrently with this application.

FIELD OF THE INVENTION

This invention relates to corrugated pipes. More particularly, this invention relates to corrugated metal pipes having a smooth internal lining with an intermediate foam layer.

BACKGROUND OF THE INVENTION

Over the years various types of pipe have been used in storm and sanitary sewer applications. Corrugated pipe is sometimes paved, at least in the floor of the pipe, to enhance the flow of water and increase the life of the pipe. Because of the corrugations in unpaved pipe, water does not drain entirely from the pipe resulting in its corrosion. Moreover, the bottom portions of the unpaved corrugated pipe would also deteriorate due to the abrasive action of sand and gravel flowing through the pipe. A coating of asphaltic or bituminous material internally covering a part or all of the corrugated pipe or linings of concrete, metal or other material were provided to facilitate hydraulic flow and to afford additional resistance to wear and corrosion at the bottom of these pipes. Such composite corrugated pipes were heavy and difficult to handle and were susceptible to breakage during handling.

U.S. Pat. No. 1,929,817 discloses a corrugated metal culvert having a metal tubular internal liner. The lined culvert was made by placing segmented blocks on the interior bottom of the culvert, inserting a sheet metal tubular liner within the culvert on the blocks and injecting a mass of material in plastic form, preferably asphalt mixed with crushed stone, between the culvert body and the liner. U.S. Pat. No. 2,081,872 discloses a corrugated culvert having a sheet layer of fibrous material resting on the inner crests of a corrugated pipe, a metal plate liner resting on the layer of fibrous material and bituminous material filling the spaces between the plate and the pipe. U.S. Pat. No. 2,746,090 discloses a paved pipe comprising a corrugated cylinder and asphalt material filling the spaces in the corrugation to afford a smooth internal surface. The paved pipe is made by placing a generally cylindrical form element inside a corrugated pipe, spaced from the pipe by a dam means, and pouring liquid asphalt between the form and the pipe. A parting substance, such as waterproof paper, may be used to protect the form from the asphalt. Since the disclosed process only paves a fraction of the pipe, the pipe may be rotated and paved several times until a totally paved internal surface is obtained. U.S. Pat. No. 3,550,639 discloses a buffer pipe for placing between metal pipes buried in the ground to absorb stresses. The buffer pipe has corrugations or bulges adjacent its opposite ends, the internal spaces of which are filled with fluid-impermeable sponge rubber to a point substantially level with the inside circumference wall of the pipe body. A neoprene rubber lining may be applied over the inside surface of the sponge rubber.

Thus while the prior art includes corrugated pipes with liners of various types, there still is a need for a corrosion resistant smooth-lined corrugated pipe that will find wide acceptance for use in storm and sanitary sewer applications.

There is also a need for a smooth-lined corrugated pipe that is lighter in weight than asphalt-paved, concrete-lined or metal-lined corrugated pipe.

There is in addition a need for a foam-filled, plastic-lined corrugated pipe that possesses toughness and corrosion resistance and is not susceptible to breakage during handling and installation.

Further, there is a need for a practical, reliable and economical method for producing such smooth-lined corrugated pipes.

SUMMARY OF THE INVENTION

The above needs have been met by my invention of a smooth-lined corrugated pipe that is filled with foamed material and lined with plastic, and of a method for making such pipe. The smooth-lined pipe comprises:

(a) a corrugated pipe,
(b) a plastic sheet liner in the form of a cylinder which is fitted to the inside of the corrugated pipe adjacent the crests of the corrugations, and
(c) a plastic foam which fills the voids between the corrugations of the pipe and the sheet liner, which foam supports the liner and acts as an adhesive to bond the liner.

Such smooth-lined corrugated pipe can be produced by the method which comprises:

(a) applying a plastic foaming mixture to the internal surface of a corrugated pipe,
(b) pressing a sheet liner in the form of an expandable cylinder against the plastic foaming mixture, and
(c) maintaining the pressure until the foaming mixture has substantially solidified.

Advantageously, the corrugated pipe is rotated at a substantially uniform speed about a generally horizontal axis while applying the foaming mixture. In addition, the foaming mixture is preferably applied to the internal surface of the pipe progressively along its length. The preferred method for associating the sheet liner with the foam-coated corrugated pipe is accomplished by the following steps:

(1) wrapping the liner around the circumference of an expandable mandrel,
(2) inserting the liner-wrapped mandrel into the foam-coated pipe, and
(3) expanding the mandrel to press the liner against the foaming mixture.

An expandable mandrel apparatus for practicing the above method comprises:

(a) a hollow cylinder,
(b) a cylinder of elastomeric material fitted about the outside of the hollow cylinder, each end of the elastomeric cylinder sealed to the corresponding end of the hollow cylinder defining an annular space between the two cylinders, and (c) fluid conducting means communicating with the annular space.

BRIEF DESCRIPTION OF THE DRAWINGS

FIG. 1 is an isometric view of a smooth-lined corrugated pipe of this invention.

FIG. 2 is a view taken along line 2—2 of FIG. 1.

FIG. 3 is a schematic diagram of the major process equipment used in making a smooth-lined corrugated pipe.

FIG. 4 is a lateral view of a plastic liner positioned on an unexpanded mandrel.

FIG. 5 is an end section view of a liner-wrapped, unexpanded mandrel within a foam-coated pipe.

FIG. 6 shows the mandrel of FIG. 5 in the expanded state.

DETAILED DESCRIPTION OF THE INVENTION

Unlined corrugated steel pipe, while exhibiting an excellent strength to weight ratio, ease of installation and favorable economics, has not been used widely for storm and sanitary sewer applications because the corrugations increase resistance to hydraulic flow. Furthermore, the galvanized steel is subject to corrosion particularly by sanitary sewer effluent. Asphalt-paved corrugated pipe has had some limited use but suffers from being heavier. It also deteriorates, cracks, delaminates, requires more care during installation and is costlier. The smooth-lined corrugated pipe of this invention provides solutions to these difficulties and problems.

The smooth, plastic-lined, corrugated steel pipe 10, as depicted in FIGS. 1 and 2, is intended primarily for storm and sanitary sewer and some culvert applications but is not limited to these. An outer steel pipe 12 which is stiffened by corrugations throughout its entire length provides the necessary rigidity and strength for the product's intended use. A sheet liner 14 which is formed into a generally cylindrical shape and is fitted to the inside of the corrugated pipe 12 adjacent the crests of the corrugations provides a tough, corrosion resistant, smooth surface for the hydraulic flow. Filling the voids created by the corrugations of the pipe 12 and liner 14 is a plastic foam material 16. The foam material 16 acts as an adhesive to bond the sheet liner 14 to the inside of the corrugated metal pipe 12 substantially against the crests of the corrugations and also to support the liner between the crests. The liner or pipe surface, or both, may be treated to enhance foam adhesion. As a result of the procedure for making the smooth-lined corrugated steel pipes 10, described in detail hereinafter, the sheet liner 14 possesses a seam 18 throughout the length of the pipe.

The corrugated steel pipe 12 may be any standard commercial product and may be fabricated from various galvanized sheet materials and other sheet materials, such as Galvalume which is a trademark designating products of Bethlehem Steel Corporation. Corrugated pipes of nonferrous metals and plastic materials are also within the scope of the invention.

The liner 14 may be any plastic or other sheet material which possesses the following characteristics: suitable strength and toughness; abrasion, chemical and impact resistance; outdoor exposure and temperature resistance; ability to bond or to be bonded to the plastic foam; and favorable economics. Another characteristic of the liner which may be appropriate under certain circumstances is nonflammability or low flammability. The preferred plastic materials for use as the sheet liner are rigid poly(vinyl chloride) (PVC) and poly(acrylonitrilebutadiene-styrene) (ABS). These materials have been accepted by various codes and specifications for other sewage pipe products. Other plastic materials, for example polypropylene (PP), may be adaptable to the product.

By way of example, when using a rectangular sheet of plastic material, the liner should be wide enough to fit the circumference of the inside cross-sectional projection of the pipe and to allow for an overlap, preferably about one inch (2.54 cm). This overlap is sealed to form a seam substantially parallel with the longitudinal axis of the pipe extending from one end of the pipe to the other end. Since commerical plastic sheet is currently available up to 60 inches (152.4 cm) wide, pipes larger than 18 inches (45.7 cm) in diameter, therefore, may have two or more seams. The length of the liner should extend the full length of the corrugated pipe with sufficient extra length to cover the flanges, if the pipe has flanges. Liner thicknesses may range from 15 to 250 mils (0.38 to 6.4 mm), preferably 30 to 125 mils (0.76 to 3.2 mm), depending on product requirements, but preferably should be at least 30 mils (0.76 mm).

The foam material 16 which acts as an adhesive and a space filler between the corrugated pipe shell and the plastic liner should comprise a rigid or semi-rigid plastic foam system. The foam system should have the following characteristics: low density of 2 to 4 lb/ft$^3$ (0.032 to 0.064 g/cc); primarily closed cells to prevent water penetration; excellent humid aging/dimensional stability; good adhesion to the corrugated pipe and the plastic liner substrates, although the substrates may be primed with an adhesive material; good compressive strength; gel and cure times consistent with process conditions; and, optionally, fire retardation.

The plastic foam system advantageously comprises at least 95% closed cells in order to prevent a sponging effect in the event that water penetrates the liner via tears or punctures.

The necessary adhesive property of the foam system has two aspects to it. Firstly, the foam must possess the ability to adhere to the corrugated steel pipe. A slight warming of the pipe to about 80°–110° F. (27°–43° C.) prior to the application of the foaming mixture to inside of the pipe helps this adhesion as well as the expansion and cure of the foam. Secondly, the foam must adhere to the liner and afford an inseparable combination. This is important in order to avoid ripping or tearing of the liner. The strength of the foam-liner bonding can be increased by solvent activation or other surface treatment of the liner.

Two component polyurethanes are the preferred foam system because the diversity of commercially available starting materials allows for formulating an optimum system meeting the above characteristics. However, other types of thermosetting foamable plastics, such as epoxies, polyesters, polyisocyanurates or urea-formaldehydes could be used provided they pass from a liquid to a solid state during the foaming step. This fluidity requirement is essential to the process described hereinafter and can possibly be met by the use of foaming components initially comprising solid particles which during the course of the foaming reaction pass through a fluid state to the solid state of the foamed product.

The smooth-lined corrugated pipe of this invention was made using the equipment depicted in FIG. 3. A cantilevered expandable mandrel apparatus 20 had cantilevered support base 22 supporting a pneumatic mandrel 24 via tubular support member 23 running the length of the mandrel. Shown better in FIG. 4, pneumatic mandrel 24 comprised a hollow steel cylinder 26 spaced from support member 23 by circular end plates 25. On the cylinder 26 was fitted a cylinder 28 of elastomeric material, such as rubber sheeting, about 1/16 inch (1.6 mm) in thickness with each end of the elastomeric cylinder 28 sealed to the corresponding end of the steel cylinder by clamps not shown, defining an annular space between the cylinders for receiving a fluid, such as a liquid or a gas. Means were provided to admit or release a fluid, preferably a compressed gas, from the annular space to expand or deflate the expandable pneumatic mandrel as required. Such means comprised piping 30 which runs alongside tubular support member 23 for a distance into steel cylinder 26 to communicate via hole 31 in the steel cylinder 26 with the space between the steel cylinder 26 and the elastomeric cylinder 28. Where support member 23 is hollow, piping 30 may pass within support member 23 into the cylinder 26. The source of compressed gas and the valve means for introducing and releasing the gas from the pneumatic mandrel are not shown. Wrapped about mandrel 24 was a plastic sheet liner 14. In the unexpanded state the mandrel should be of such diameter to provide about a 1 to 2.5 inch (25 to 64 mm) annular space when the liner-wrapped mandrel is positioned concentrically within the pipe 12. The mandrel should be of sufficient length so that it is at least coextensive with the length of the pipe and, preferably, extends beyond the ends of the pipe. When expanded, the mandrel should maintain the plastic liner substantially against the crests of the corrugations until the foaming mixture has gelled and hardened.

Other types of expandable cylindrical mandrels, however, could be used. A multiple number of mandrels could be arranged in turret or ferris wheel fashion to increase the rate of producing smooth-lined corrugated pipes.

The expandable mandrel shown in FIGS. 3 and 4 was of sufficient length to manufacture 5 foot (1.5 m) long smooth-lined corrugated pipe. For the manufacture of 20 foot (6.1 m) long smooth-lined corrugated pipes a plurality of elastomeric cylinders may be fitted along the length of a single hollow steel cylinder with appropriate piping to convey compressed gas to each elastomeric cylinder.

A pipe rotator/transporter 32 utilized a motorized rubber roller assembly 34 to rotate the corrugated pipe 12 about its longitudinal axis. The pipe was rotated at a predetermined rate dependent upon pipe diameter, foam output and spray coverage so that a foaming mixture was sprayed or deposited uniformly on the inner corrugated surface as foam nozzles 36 on foam dispensing machine 38 were moved progressively through the pipe. The pipe rotator/transporter 32 had wheels 40 for movement along track system 42 to readily move the pipe on and off the expandable mandrel 24. As an added feature the roller assembly 34 may be movable vertically to accommodate different diameter pipes.

Foam dispensing machine 38 may be any commercially available metering, mixing and dispensing apparatus meeting the following requirements: an adequate, rapid mixing of the two component streams; a uniform foam output; a froth or spray type dispensing; and dimensionally capable of dispensing the foam mixture within the pipe. Machines marketed by Olin Chemicals, Inc. and Gusmer, Inc. meet these requirements. Advantageously, the foam machine 38 and boom mounted dispensing nozzles 36 are mounted on a wheeled structure 44 to allow the nozzles to be moved in and out of the corrugated pipe along track system 42. Preferably, the wheeled structure 44 is motorized to insure a uniform withdrawal rate of the nozzles from the pipe during the dispensing of the foam components.

Auxiliary equipment, not shown in FIG. 3, would include liner preparation tables, corrugated pipe cleaning, priming (if required) and preheating tables, materials handling equipment, a tool for sealing the seam of the liner and a tool for flanging the ends of the liner to conform to the flanged ends of the corrugated pipe.

In manufacturing a smooth, plastic-lined corrugated pipe using the apparatus shown in FIG. 3, a plastic liner sheet 14 was cut to fit the circumference of the inside cross-sectional projection of the pipe 12 and to allow for an overlap 19 which, in this instance, became a substantially longitudinal seam 18, as shown in FIGS. 1 and 2, running the length of the pipe. If the pipe circumference was greater than the available width of the plastic sheet, it would be necessary to join two or more lengths side by side. In such case, the resultant smooth-lined corrugated pipe would have the same number of substantially longitudinal seams as the number of sheets joined together. The length of the sheet liner should be equal to the pipe length, or greater if the ends of the liner are flanged. Referring to FIG. 4, liner 14 was wrapped around unexpanded pneumatic mandrel 24 in an overlapping fashion to form an expandable cylinder and held in place lightly with tape (not shown). It is also possible to spirally wrap one or more plastic liner sheets around the mandrel in the form of an expandable liner cylinder which results in a smooth-lined corrugated pipe having a helical seam throughout its length.

Alternatively, an extruded cylinder of thin plastic sheet liner that can be expanded in the radial direction may be slipped over the pneumatic mandrel. The plastic material should have such properties that it retains its expanded state and does not separate from its bonding with the foam material when the mandrel is withdrawn from the pipe. A seamless extruded cylinder of thin plastic sheet liner will obviously result in a smooth lined pipe without an internal seam.

Corrugated pipe 12 was cleaned as necessary. An adhesive primer, such as Bondmaster 81-0590, National Starch and Chemical Corp., preferably was applied to the inner surface of the pipe whereupon the pipe was preheated to 80° F. to 110° F. (27°–43° C.).

Referring to FIG. 3, the heated pipe was transferred to the pipe rotator/transporter 32, positioned in line with liner-wrapped mandrel 24. Foam dispensing machine 38 was moved toward the pipe inserting foam dispensing nozzle 36 into the pipe. Roller assemblies 34 were activated to rotate the pipe. Rotational speed depends on the amount of foam required, pipe length, foam dispensing machine output and width of foam coverage from the nozzle. The requisite amount of foaming components were sprayed progressively along the inside of the pipe by simultaneously withdrawing the nozzles at a constant, predetermined rate through the rotating pipe. Nozzle withdrawal rate is dependent upon the amount of foam required, the foam dispensing machine output and the pipe length.

Table I shows an example of the process operating parameters and how to calculate such parameters for any situation.

TABLE I

Corrugated pipe: diameter - 15 in.
length 5 ft.
corrugations - 0.5 in. deep
Foam machine output: 15 lb/min.
Foam density: 2.5 lb/ft$^3$
Foam coverage from nozzle: 4 in. wide Calculations Volume of foam required  = ($\frac{1}{2}$) ($\pi$ × pipe diameter × pipe length × corrugation depth)
= ($\frac{1}{2}$) $\pi$ × Dp × Lp × Cd
= .409 ft$^3$ Weight of foam required = Volume of foam × foam density
= .409 ft$^3$ × 2.5 lb/ft$^3$
= 1.022 lb.

Foam dispensing time = $\frac{\text{weight foam required}}{\text{foam machine output}}$ = $\frac{1.022 \text{ lb.}}{15 \text{ lb/min.}}$ = 0.068 min. (4.09 sec.)

Nozzle withdrawal rate = $\frac{\text{pipe length covered per nozzle}}{\text{foam dispensing time}}$ = $\frac{5 \text{ ft.}}{0.068 \text{ min.}}$ = 73.3 ft/min.

Rotation speed of pipe for full foam coverage = $\frac{\text{pipe length covered per nozzle}}{\text{nozzle coverage width}}$ × $\frac{1}{\text{foam dispensing time}}$ = $\frac{5 \text{ ft}}{\frac{1}{3} \text{ ft}}$ × $\frac{1}{.068 \text{ min}}$ = 220.6 rpm After the foaming mixture had been applied, the rotation was stopped and the liner-wrapped mandrel in the unexpanded condition was inserted within the foam-coated pipe 12 as shown in FIG. 5 without removing or scraping away foaming material to expose the crests of the corrugations; that is to say the foaming mixture still covered the crests when the liner-wrapped mandrel was inserted. Air was passed through piping means 30 to expand the mandrel thereby pressing the sheet liner 14 against the foaming mixture 16 and the crests of the corrugations as shown in FIG. 6. A low pressure of about 3 psi was maintained until the foaming mixture had substantially solidified, which may take 5–15 minutes depending upon the foaming components used. The operation is performed at a temperature below the softening temperature of the plastic liner material. In other words, it is not necessary to heat the apparatus or materials to or above the softening temperature of the plastic liner material in order to press and maintain the liner against the foam and the crests.

The mandrel was deflated by allowing the air to exit via piping means 30. The lined corrugated pipe was removed from the mandrel and taken to a finishing station where the substantially longitudinal seam was sealed. For PVC and ABS liner materials a commercial solvent such as clear PVC cement sold by SOS Products Co., Inc., East Greenville, PA, can be applied with a lance-like tool to effect the seal. A heated ironing tool was used to flange the ends of the liner as required.

The method for producing a smooth-lined corrugated pipe is applicable to any standard commerical corrugated pipe size, for example, 12 in. (305 mm) to 120 in. (3050 mm) diameter and up to 20 foot (6.1 m) lengths, but is not limited to these. To suit various connecting systems, i.e. pipe section to pipe section, laterals, "T's", etc., currently available, the ends of our pipe product may or may not be flanged.

The above described method was used to produce the examples of smooth-lined corrugated pipe in Table II. Fifteen inch (381 mm) internal diameter, 16 gage (1.63 mm) corrugated steel pipe, PVC plastic liner and rigid urethane foam filler was used in each example. The PVC liner was Vynaloy 031-132 from B. F. Goodrich Co. and the urethane foam was Autofroth A602C4 from Olin Chemical Co., except in Examples G16U62-1,2,3 which used Boltaron from General Tire Corp. and R350X from Jefferson Chemical Co., respectively. Each pipe shell was water washed and dried prior to application of the foaming mixture.

TABLE II

| Example | Corrugated Steel Coating | Adhesive Primer[1] | Liner Thickness (mils) |
|---|---|---|---|
| G16U35-1,2,3,22,23,24 | 2 oz Galvanized copper-bearing steel sheet | No | 35 |
| G16U55-4,5,6,19,20,21 | 2 oz Galvanized copper-bearing steel sheet | No | 55 |
| G16P55-25,26,27 | 2 oz. Galvanized copper-bearing steel sheet | Yes | 55 |
| GA16U35-13,14,15 | Zinc-aluminum alloy coated steel sheet | No | 35 |
| GA16P35-10,11,12 | Zinc-aluminum alloy coated steel sheet | Yes | 35 |
| PG16U55-7,8,9,16,17,18 | 2 oz. Galvanized copper-bearing steel sheet having a 20 mil PVC polymer coated exterior | No | 55 |
| G16U62-1,2,3 | 2 oz Galvanized copper-bearing steel sheet | No | 62 |

[1]Adhesive Primer - Bondmaster 81-0590, National Starch and Chemical Corp. Primer was diluted to 10 percent concentration with methylethylketone and sprayed onto interior surface of pipe shell The examples of Table II were subjected to the tests listed and described in the following Table III.

TABLE III

| Test | Example | Conditions | Remarks |
|---|---|---|---|
| Outdoor Exposure | G16U62-1 | 12 months exposure, horizontal position, outdoor site | All pipes showed no visible damage or deterioration |
|  | G16P55-25 GA16U35-13 | 6 months exposure as above | All pipes showed no visible damage or deterioration |

TABLE III-continued

| Test | Example | Conditions | Remarks |
| --- | --- | --- | --- |
| | PG16U35-16 | | |
| Flammability Resistance | G16U35-1 | Cut section of pipe exposed to propane torch flame | Linear and foam burned and charred in vicinity of flame, but self extinguished when torch removed |
| Parallel Plate Loading | G16U35-22 G16U55-19 | Load applied with a universal test machine on 12 inch long sections of pipe | No damage to foam/liner system at 12.5% deflection, 750 lb load |
| Impact Resistance | G16U35-22 G16U55-19 G16P55-26 | Dropped dart tests on 12" long sections of pipe at 75° F. (24° C.) | Foam/liner system not damaged by impact loads of 150 ft-lb. |
| | G16U35-1,2 PG16U55-7,8 | Liner inside ends of pipe subjected to blows of ball peen hammer at 20° F. (−7° C.) | Liner dented but not cracked or ruptured |
| Chemial Resistance | G16U35-22 G16P55-26 GA16U35-14 GA16P35-10 PG16U55-7 | 4" × 6" sections cut from each pipe were exposed to water, 3% salt water, and sulfuric acid-pH 2 to 3 at 75° F. (24° C.) for 3 months | No visible attack on the foam or the liner |

While particular embodiments of the present invention have been shown and described, it is apparent that various changes and modifications may be made, and it is therefore intended in the following claims to cover all such modifications and changes as may fall within the true spirit and scope of the invention.

I claim:

1. A method for producing a smooth-lined corrugated pipe which comprises:
   (a) applying a plastic foaming mixture to the internal surface of a corrugated pipe progressively along its entire length,
   (b) pressing a sheet liner in the form of an expandable cylinder against the plastic foaming mixture, and
   (c) maintaining the pressure until the foaming mixture has substantially solidified.

2. The method of claim 1 which includes rotating the corrugated pipe about a generally horizontal axis while applying the foaming mixture in step (a).

3. The method of claims 1 or 2 in which step (b) comprises:
   (1) wrapping the sheet liner around the circumference of an expandable mandrel,
   (2) inserting the liner-wrapped mandrel into the foam coated pipe, and
   (3) expanding the mandrel to press the liner against the plastic foaming mixture.

4. The method of claim 3 in which the sheet liner is wrapped about the mandrel to form an expandable sheet liner cylinder.

5. The method of claim 3 in which steps (b) and (c) are performed below the softening temperature of the sheet liner.

6. The method of claim 3 in which the sheet liner is pressed against the plastic foaming mixture and substantially against the crests of the pipe corrugations in step (3).

7. A method for producing a smooth-lined corrugated pipe which comprises
   (a) applying a plastic foaming mixture to the internal surface of a corrugated pipe progressively along its entire length,
   (b) inserting a sheet liner in the form of an expandable cylinder within the foam-coated pipe with the plastic foaming mixture covering the crests of the corrugations,
   (c) pressing the sheet liner against the plastic foaming mixture and against the crests of the corrugations at a temperature below the softening temperature of the sheet liner, and
   (d) maintaining the pressure until the foaming mixture has substantially solidified.

* * * * *